United States Patent
Deutsch et al.

(10) Patent No.: US 6,294,143 B1
(45) Date of Patent: *Sep. 25, 2001

(54) PROCESS FOR THE PREPARATION OF DISCRETE PARTICLES OF CALCIUM CARBONATE

(75) Inventors: Donald Richard Deutsch, Walnutport; Kenneth James Wise, Schnecksville, both of PA (US)

(73) Assignee: Minerals Technologies Inc., Bethlehem, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/047,136

(22) Filed: Mar. 24, 1998

(51) Int. Cl.$^7$ .................................................. C01F 11/18
(52) U.S. Cl. ............................................ 423/432; 423/165
(58) Field of Search ................................ 423/430, 432, 423/165; 106/464

(56) References Cited

U.S. PATENT DOCUMENTS

| | | | |
|---|---|---|---|
| 2,188,663 | 1/1940 | McClure et al. | 423/432 |
| 2,467,082 | 4/1949 | Fleck | 423/432 |
| 3,443,890 | 5/1969 | Sisson et al. | 423/432 |
| 4,018,877 | 4/1977 | Woode | 423/165 |
| 4,237,147 | 12/1980 | Merten et al. | 426/590 |
| 5,227,025 * | 7/1993 | Kunesh et al. | 162/181.2 |
| 5,332,564 | 7/1994 | Chapnerkar et al. | 423/432 |
| 5,741,471 * | 4/1998 | Deutsch et al. | 423/432 |

* cited by examiner

Primary Examiner—Steven P. Griffin
Assistant Examiner—Stuart L. Hendrickson
(74) Attorney, Agent, or Firm—Marvin J. Powell; Terry B. Morris

(57) ABSTRACT

A product and a process for the preparation of discrete calcium carbonate particles that result from preparing an aqueous calcium carbonate slurry containing carbohydrates, carbonating the aqueous calcium carbonate slurry while maintaining the selected starting carbonation temperature. The product of the present invention is discrete particles of calcium carbonate which are especially useful in paints, plastics, paper coating, paper filling, and because of the purity level of the calcium carbonate particle may be used in cosmetics, pharmaceuticals and food applications.

4 Claims, 5 Drawing Sheets

US 6,294,143 B1

PROCESS FOR THE PREPARATION OF DISCRETE PARTICLES OF CALCIUM CARBONATE

FIELD OF INVENTION

The present invention relates to a process and a product produced using the process. The product is discrete particles of calcium carbonate having an average particle size, a specific surface area and high purity. The method for preparing the discrete calcium carbonate particles of the present invention requires carbonating an aqueous calcium hydroxide slurry in the presence of carbohydrates, while varying the selected starting carbonation temperature, and/or the concentration of the carbohydrates.

The calcium carbonate particles produced according to the method of the present invention are particularly useful as fillers in paper, as pigment for coated paper, as pigments for paints, as impact modifiers in polymers, and because of such high purity, may find specific application in the food, nutrition, cosmetic and pharmaceutical industries.

BACKGROUND OF THE INVENTION

Precipitated calcium carbonate (PCC) pigments have found increasing application as fillers and as coating pigments in the manufacture of paper and paper board. This utility arises by virtue of PCC's excellent optical and physical properties when used for papermaking.

PCC is traditionally prepared by carbonating an aqueous calcium hydroxide slurry with a carbon dioxide gas to obtain calcium carbonate particles. The traditional process for the production of PCC is quite adequate for particles that do not require discreteness. However, there are problems with the traditional method for producing PCC where discreteness of the final particle is required.

When attempting to precipitate discrete PCC particles by using the traditional process that would naturally form clustered or agglomerated morphologies, it is very difficult to control process parameters so as to consistently produce discrete particles of calcium carbonate. Consequently, particles made according to the traditional process result in average particle size particles and specific surface area that are not very predictable with regard to control. The present invention resolves the problems of the prior art.

It is therefore an object of the present invention to provide a method for producing discrete calcium carbonate particles. Another object of the present invention is to provide a method for producing discrete calcium carbonate particles having a predictable average particle size and having a specific surface area. While another object of the present invention is to provide a reliable method for the preparation of discrete calcium carbonate particles. While a further object of the present invention is to produce discrete calcium carbonate particles having high calcium carbonate purity. While still a further object of the present invention is to produce discrete calcium carbonate products from lime sources of varying quality.

These and other objectives of the present invention will become more apparent as further provided in the related art and detailed description which follows.

RELATED ART

U.S. Pat. No. 5,332,564 discloses a process for producing rhombic or barrel shaped PCC comprising slaking quicklime in an aqueous sugar solution to form a slaked lime slurry, carbonating the slaked lime slurry with carbon dioxide containing gas until rhombic shape calcium carbonate is precipitated.

U.S. Pat. No. 4,237,147 discloses a dry carbonate beverage concentrate and a process for preparing the same which comprises admixing with water a) amorphous calcium carbonate and b) an anhydrous nontoxic acid.

U.S. Pat. No. 4,018,877 discloses an improved process for producing a calcium carbonate by introducing a complexing agent into the calcium carbonate slurry either during or after the primary nucleation stage. The complex agent is selected from a group which includes sucrose or glucose.

U.S. Pat. No. 3,443,890 discloses a process for producing PCC by carbonating an aqueous calcium hydroxide slurry in the presence of saccharides and a second active component selected from the group consisting of active silicon dioxide compounds.

U.S. Pat. No. 2,467,082 discloses a process for producing chalk by carbonating an aqueous calcium hydroxide slurry in the presence of sugar beet residue extract.

U.S. Pat. No. 2,188,663 discloses the use of saccharides and polyvinyl alcohol as an additive to an aqueous calcium hydroxide slurry prior to carbonation to form a calcium carbonate product.

J.P. 9-156,923 discloses a process at 250° C. using a polymeric saccharide and a calcium carbonate seeded aqueous calcium hydroxide slurry to produce a calcium carbonate particle of 25 $m^2/g$.

J.P. 9-271,313 discloses a method for using inexpensive low grade furnace gas ($CO_2$) to make a spindle shaped Precipitated Calcium Carbonate at 50° C. to 65° C. The method depends on the mesh size of the lime to control particle size and no additives are used.

After viewing the related art, there continues to be a need for a novel method for producing discrete calcium carbonate.

SUMMARY OF INVENTION

The present invention provides a product and a process for producing discrete calcium carbonate particles. The method requires the preparation of an aqueous calcium hydroxide slurry, adjusting the slurry to a selected starting carbonating temperature, adding carbohydrates to the slurry and carbonating the aqueous calcium hydroxide slurry with carbon dioxide gas to produce discrete calcium carbonate particles.

The present invention also provides discrete calcium carbonate particles, as opposed to traditionally formed clustered particles, are more economical to produce, since they may require less additives, less processing, and result in a predictable, discrete, calcium carbonate particle of ninety-eight percent purity.

BRIEF DESCRIPTION OF PHOTOGRAPHS

The present invention is described in connection with the accompanying Scanning Electron Micrographs (SEM's), in which.

DETAILED DESCRIPTION OF THE INVENTION

Figure 1:
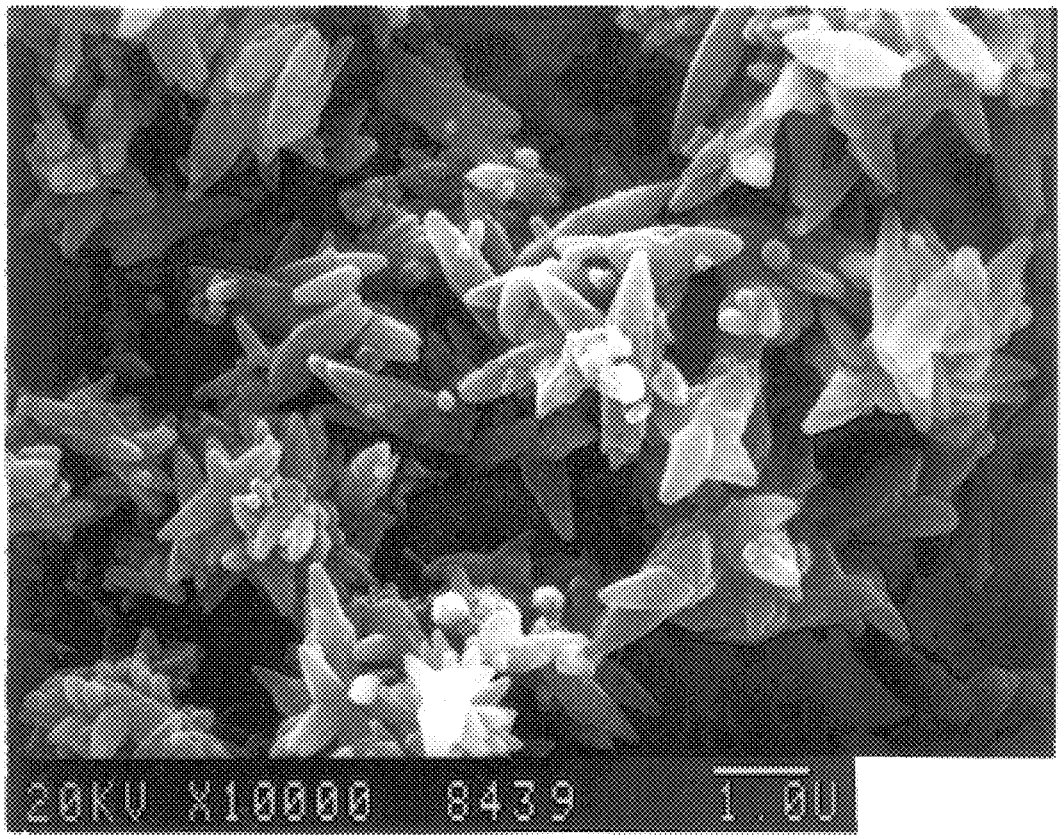
FIG. 1 Shows the prior art scalenohedral form of calcite.
Figure 2:
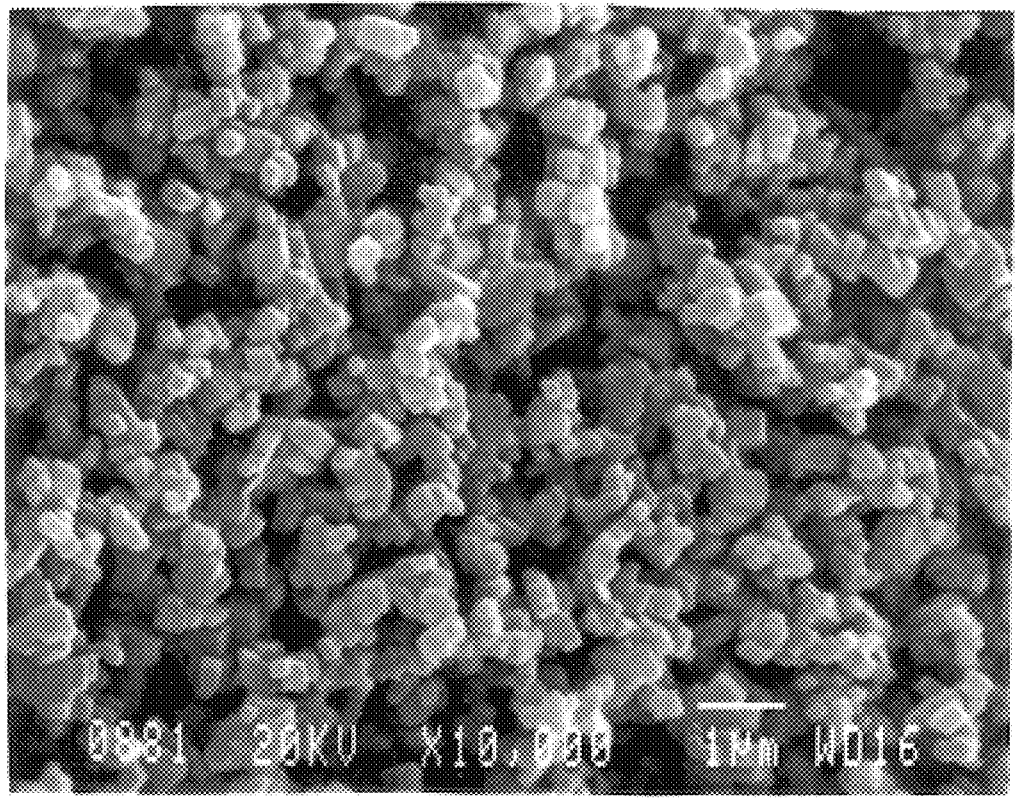
FIG. 2 Shows the prior art rhombohedral form of calcite.
Figure 3:
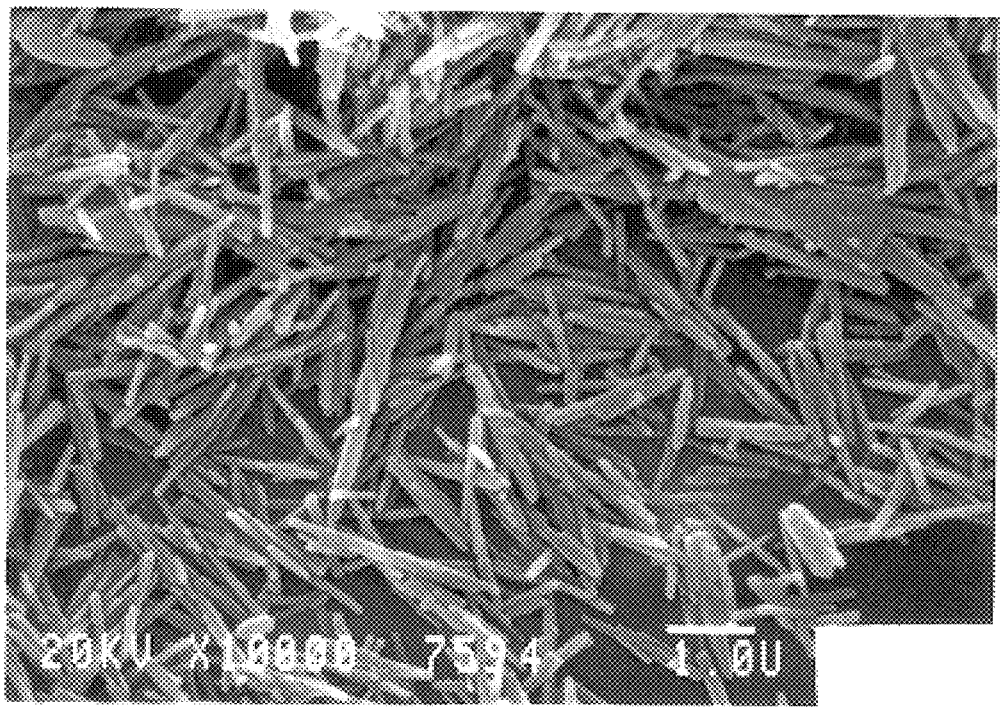
FIG. 3 Shows the prior art aragonite.
Figure 4:
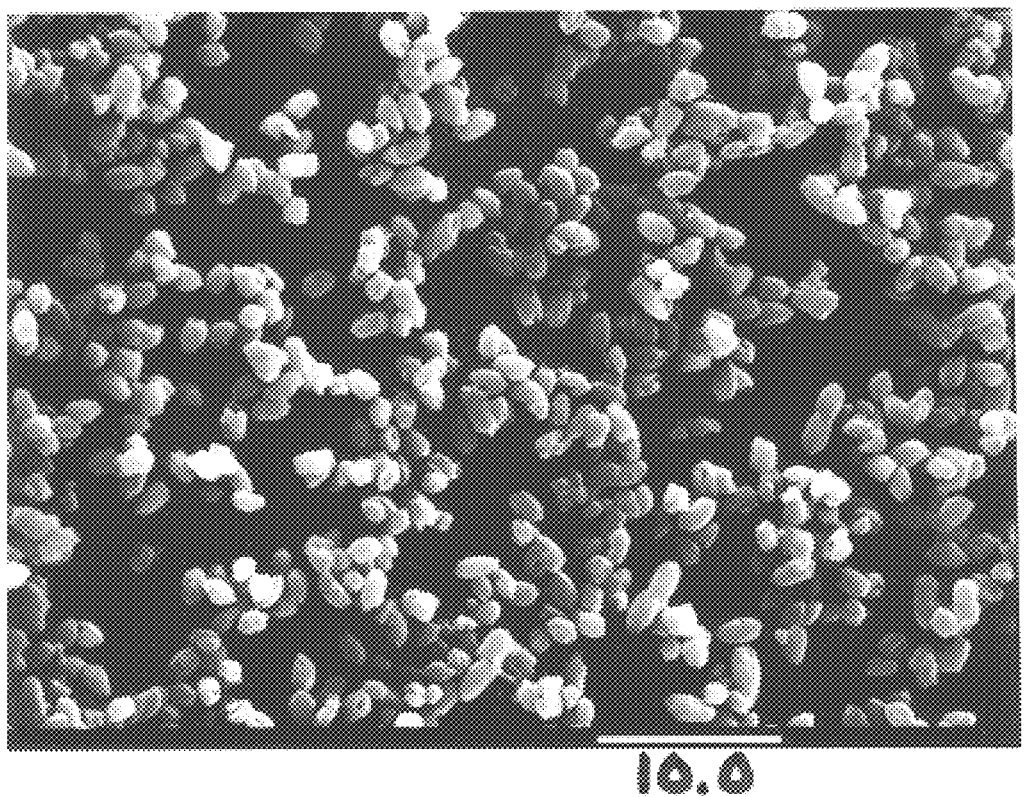
FIG. 4 Shows the prior art stubby-prismatic form of calcite.
Figure 5:
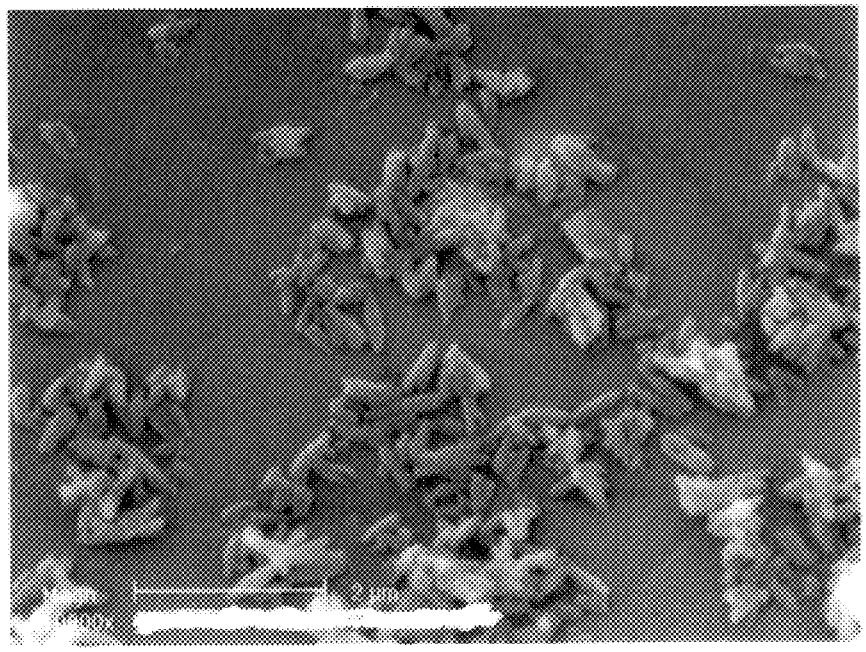
FIG. 5 Shows an SEM of the novel discrete calcite crystals of the present invention; and, FIG. 6. Represents still a further magnified view of the novel discrete calcite crystals of the present invention.
Figure 6:
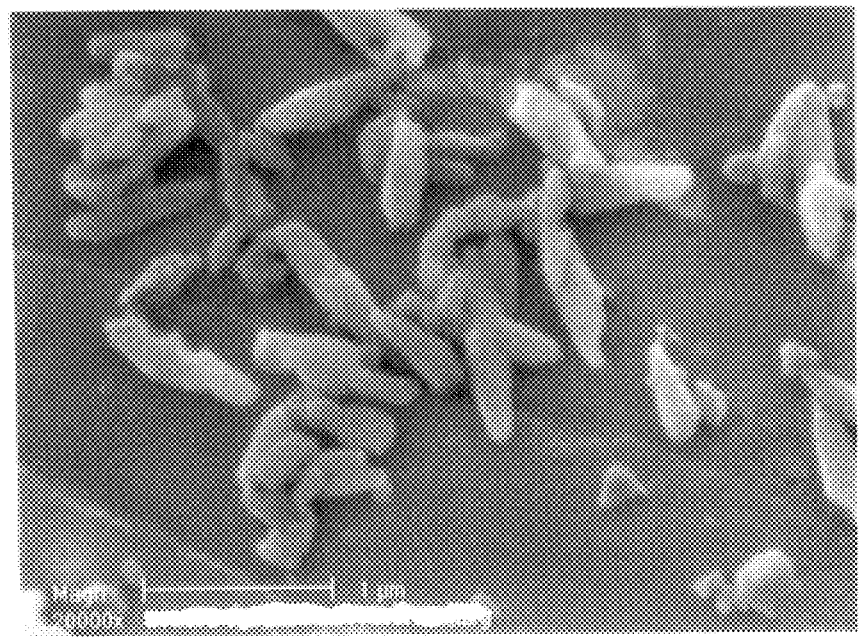

Accordingly, the present invention provides a method for the preparation of discrete calcium carbonate particles. The method requires introducing gaseous carbon dioxide into an aqueous calcium hydroxide slurry containing carbohydrates, while varying the selected starting carbonation temperatures and while holding the carbohydrate concentration level constant or, in another aspect, varying the carbohydrate concentration in the calcium hydroxide slurry while holding the starting carbonation temperature constant. In still another aspect, the starting carbonation temperature and carbohydrate concentration in the calcium hydroxide slurry are varied in combination.

All percentages used herein are weight percent and, when used to describe the amount of an additive introduced into the process, the percentages are weight percent, based on the calcium carbonate equivalent of the available lime.

Discrete, as used herein, means that the particles are generally distinct and unconnected. A preferred particle is scalenohedral and has an aspect ratio, which compares length/width (l/w), averages about 2.0 or more.

The average particle size, as used herein refers to the equivalent spherical diameter of an individual particle or as part of a cluster or agglomerate, as opposed to the equivalent spherical diameter of the cluster or the agglomerate itself. An agglomerate is a rounded mass or cluster of particles. A cluster or clustering as is used herein means bunches or to grow or form bunches.

The aqueous calcium hydroxide slurry of the present invention has from about 5 weight percent to about 30 weight percent calcium hydroxide. Preferably, the calcium hydroxide concentration in the slurry is from about 10 weight percent to about 20 weight percent.

An important aspect of the present invention is that the aqueous calcium hydroxide slurry contain carbohydrates. These carbohydrates may be added to the slurry by any methods known in the art, such as stirring, mixing or agitating. The carbohydrates are added to the aqueous calcium hydroxide slurry all at once, as opposed to intermittently or continuously throughout the carbonation process. Carbohydrates that are preferably useful, but are not limited to these specified carbohydrates, in the present invention include monosaccharides, disaccharides, and polysaccharides. Monosaccharides include, but are not limited to, simple sugars such as fructose and glucose. Disaccharides include sucrose, maltose, lactose and cellobiose, while polysaccharides generally include nine or more monosaccharides linked together by glycosidic bonds. Non-limiting examples include, starch, cellulose, and glycogen.

Carbohydrates that are useful in the present invention are preferably selected from the group consisting of sucrose, glucose, fructose, raw sugar, molasses, gums, starches and other organic compounds and the like. The carbohydrates present in the aqueous calcium hydroxide slurry are generally found at a concentration level of from about 0.05 weight percent to about 3.0 weight percent, based on the calcium carbonate equivalent of the available lime. The preferred carbohydrate is sucrose. The concentration of sucrose present in the aqueous calcium hydroxide slurry is preferably from about 0.1 weight percent to about 0.5 weight percent.

Another important aspect of the product and process of the present invention is the selected starting carbonation temperature. The starting carbonation temperature is the temperature of the aqueous calcium hydroxide slurry just prior to and just before adding the gaseous carbon dioxide to start carbonation with no required means to control the temperature during the carbonation process. What has been found is that by varying the selected staring carbonation temperature from about 20 degrees Centigrade to about 85 degrees Centigrade in combination with varying the carbohydrate concentration in the calcium hydroxide slurry from about 0.05 weight percent to about 3.0 weight percent, discrete calcium carbonate particles are produced having an average particle size of from about 0.1 microns to about 3.0 microns and having a specific surface area from about 2 square meters per gram to about 60 square meters per gram. It is understood throughout this specification that control of temperature after the start of carbonation can be performed as long as such does not substantially inhibit the formation of discrete particles.

In a preferred embodiment of the present invention, an aqueous calcium hydroxide slurry having from about 10 weight percent to about 20 weight percent calcium hydroxide, from about 0.1 weight percent to about 1.0 weight percent carbohydrates, and a selected starting carbonation temperature of from about 30 degrees Centigrade to about 75 degrees Centigrade produces discrete calcium carbonate particles having an average particle size of from about 0.1 microns to about 3.0 microns, and a specific surface area of from about 2 square meters per gram to about 25 square meters per gram.

The nature of the carbon dioxide containing gas is not a particularly critical aspect of the present invention. Pure carbon dioxide gas may be employed or standard mixtures of carbon dioxide in either air, or nitrogen, may also be used in the method of the present invention. Liquid carbon dioxide, as well, can be used in accordance with the product and process of the present invention, by introducing the liquid carbon dioxide in its gaseous state during the carbonation process step.

While the product and method for the production of discrete calcium carbonate particles may be obtained using various limes and lime concentrations and lime qualities, it has been found that it is particularly suitable to use lime concentration wherein the calcium hydroxide concentration of the slurry produced therefrom is greater than about 5 weight percent.

In another embodiment for producing the discrete calcium carbonate particles of the present invention, it was found that while maintaining the selected starting carbonation temperature, and while maintaining the level of carbohydrates constant, discrete calcium carbonate particles were produced from different limes. The particles were characterized as having an average particle size of from about 0.1 microns to about 3.0 microns and specific surface areas of from about 2 square meters per gram to about 60 square meters per gram. The carbonation of the aqueous lime slurry by the introduction of the carbon dioxide is continued until calcite precipitation is substantially complete. The carbonation process is preferably complete when the pH of the carbonated slurry is about neutral, seven(7), and the calcium carbonate particle has a purity of about ninety-eight(98) percent calcium carbonate.

Even after the carbonation process is complete, there still maybe some unreacted calcium hydroxide present in the carbonated slurry. Various techniques, known to those skilled in the art, may be used to accomplish complete neutralization of the remaining calcium hydroxide, which in the present invention is only, approximately less than or equal to about two(2) percent. These techniques include, for example, monitoring the slurry pH with the introduction of the additional carbon dioxide gas, as is necessary for treating the unreacted calcium hydroxide. The carbonated slurry may also be treated with a sufficient amount of an organic or inorganic polybasic acid such as citric, maleic, malic, malonic, phthalic, tartaric, boric, phosphoric, sulfurous or sulfuric acid.

The average particle size of the discrete particles of calcium carbonate produced according to the method of the present invention can range from about 0.1 microns to about 3.0 microns. The average particle size of the particles produced according to the present invention, were determined by using a Micromeritics Sedigraph 5100 which uses x-rays to measure sedimentation rate relative to size.

In order to determine the specific surface area of the calcium carbonate particles of the present invention, a Micromeritics FLOWSORB II 2300, which employed the BET theory with nitrogen as the adsorbing gas, can be used to determine surface area.

While varying the selected starting carbonation temperature, as well as varying the carbohydrate concentration, various shapes and sizes of discrete particles are produced, it is noted that the invention should not be so limited in either scope or coverage. Additionally, the examples which follow are merely illustrative of the product and process of the present invention and are not to be construed in any manner whatsoever as limiting the scope of the invention which is more clearly defined by the appended claims.

particle size and found to have an average particle size of 0.88 micron. The product was shown by SEM to be well dispersed and quite discrete, a portion was vacuum filtered and the filter cake dried at approximately 165° C. for at least one hour to give a PCC product having a specific surface area of 13.5 m$^2$/g. This experiment is identified as Example 1 in Table 1.

EXAMPLES 2, 3 and 4

Three additional samples were synthesized at different starting carbonation temperatures, i.e. 60° C., 65° C. and 70° C. The data from Examples 1–4 are compared in Table 1.

EXAMPLE 5

Example 5 was prepared after the fashion of Example 1 using the same lime but with the following changes. The calcium hydroxide slurry concentration was 10.7% (0.114 g/cc) instead of 14.2 weight percent. The sucrose addition was again 0.5% but the gas consisted of 18% $CO_2$ rather than 10% $CO_2$. The $CO_2$ rate was 1.75 SLM providing a reaction time of 63 minutes to a pH of 8.0.

The initial reaction temperature was 60° C. The product was screened through U.S. Standard No. 325 (44 microns) sieve to remove grit. The product had an average particle size of 1.30 microns and had a specific surface area (SSA) of 10.4 m$^2$/g. This experiment is identified as Example 5 in Table 1.

TABLE 1

| | SUCROSE CONCENTRATION LEVEL WITH TEMPERATURE VARIABLE | | | | | | |
|---|---|---|---|---|---|---|---|
| Example | Lime Type | Slurry Conc. (%) | Reaction Time (min) | Sucrose (%) | React. Temp. (° C.) | APS (micron) | SSA (m$^2$/g) |
| 1 | Bellefonte | 14.2 | 263 | 0.5 | 55 | 0.88 | 13.5 |
| 2 | Bellefonte | 15.1 | 271 | 0.5 | 60 | 1.05 | 11.1 |
| 3 | Bellefonte | 14.1 | 287 | 0.5 | 65 | 1.27 | 7.1 |
| 4 | Bellefonte | 14.6 | 213 | 0.5 | 70 | 1.38 | 6.1 |
| 5 | Bellefonte | 10.7 | 63 | 0.5 | 60 | 1.30 | 10.4 |

EXAMPLE 1

A cylindrical stainless steel reactor having a hemispherical bottom, equipped with a high-speed agitator driven by a ¹⁄₁₅ hp variable speed motor, and a stainless steel tube curved under the center of the bottom blade for the introduction of a carbon dioxide/air stream, was used for preparation and reaction of calcium hydroxide (slake) to make the present invention.

A 14.2% weight percent (0.154 g/cc) aqueous calcium hydroxide slurry was prepared by adding 250 g of granular Bellefonte lime; having an available calcium oxide content of 94 or greater weight percent as determined by ASTM procedure C-25-72, to 2000 ml of water in the 4-liter reactor, at 50° C. and stirred at 1100 RPM for ten minutes. The slurry was screened through a 60 mesh sieve to remove grit and heated to a starting carbonation temperature of 55° C. The agitator was adjusted to 1250 RPM and 0.5% Domino Sugar, manufactured by Domino Sugar Corporation, hereinafter referred to as sucrose by weight of calcium carbonate equivalent of the available lime as added to the slurry. The slurry was carbonated to precipitate calcium carbonate by introducing a gas mixture of 10% carbon dioxide in air at 0.45 SLM into the slurry. The carbonation was continued for 263 minutes until the pH value was less than 8.0. The slurry was passed through U.S. Standard No. 325 (44 microns) sieve to remove grit. The slurried product was evaluated for The data indicate that the calcium hydroxide slurry concentration does have an effect on the resulting particle size of the product. Although the magnitude of the change will likely differ with various limes, higher concentration tends to produce a finer particle size (compare #2 and #5). Example 1 through 4 exhibit the effect of temperature on particle size while maintaining the sucrose level constant. As the temperature rises, the particle size increases and the specific surface area declines.

EXAMPLES 6, 7, 8

Three samples were synthesized following the procedure of Example 1 using Bellefonte lime but at 70° C. with 0.4% and at 50° C. with 0.15% and 0.1% sucrose. These samples are compared with the previous sample Example 4 in following Table 2.

TABLE 2

| | EFFECT OF ADDITIVE LEVEL | | | | |
|---|---|---|---|---|---|
| Example | Lime Type | Sucrose (%) | Reaction Temp. (° C.) | APS (micron) | SSA (m$^2$/g) |
| 4 | Bellefonte | 0.5 | 70° | 1.38 | 6.1 |
| 6 | Bellefonte | 0.4 | 70° | 1.49 | 6.0 |

TABLE 2-continued

EFFECT OF ADDITIVE LEVEL

| Example | Lime Type | Sucrose (%) | Reaction Temp. (° C.) | APS (micron) | SSA (m²/g) |
|---|---|---|---|---|---|
| 7 | Bellefonte | 0.15 | 50° | 1.42 | 8.2 |
| 8 | Bellefonte | 0.1 | 50° | 1.56 | 7.0 |

The data in Table 2 show, that by controlling both temperature and sucrose level, an average particle size can be generally maintained at predetermined starting carbonation temperatures.

EXAMPLE 9

A 70-gallon modified mortar mixer was used to prepare a calcium hydroxide slurry for a scaled-up carbonation. The carbonation was carried out in a 30-liter jacketed, baffled cylindrical stainless steel reactor having an internal diameter of 11.5 inches, a height of 20 inches, and having a hemispherical bottom. The reactor was equipped with a high-speed agitator having two 4.5 inch diameter flat blade turbine impellers positioned about 4 inches and 8 inches from the bottom and driven by a 5 HP variable speed motor. It was also equipped with an 0.25 inch inside diameter stainless steel tube curved under the center of the bottom of the blade for the introduction of a carbon dioxide/air stream. A 15.7 weight percent (0.1692 g/cc) aqueous calcium hydroxide slurry was prepared by adding 3000 g of Bellefonte lime to 18.0 liters of water in the above described 70 gallon mortar mixer, at 50° C. and stirred for 10 minutes. The slurry was screened through a 60 mesh sieve to remove grit and heated in the reactor to a starting carbonation temperature of 45° C. The agitator was adjusted to 615 RPM and 0.15 percent sucrose by weight, based on the calcium carbonate equivalent of the available lime, was added to the slurry. The calcium hydroxide slurry was carbonated to precipitated calcium carbonate by introducing a gas mixture of 10 volume percent carbon dioxide in air at 4.4 standard liters per minute (SLM) into the slurry. The carbonation was continued until the pH was less than 7.4. The slurry was passed through U.S. Standard No. 325 (44 microns) sieve to remove grit. This experiment is identified as Example 9 in Table 3.

EXAMPLE 10

This sample was prepared from Bellefonte lime after the fashion of Example 9 on plant equipment. The reaction conditions batch time, temperature and sucrose level were generally the same. This experiment is identified as Example 10 in Table 3.

TABLE 3

PLANT TRIAL VERSUS LABORATORY TRIAL

| Example | Description | Lime Type | Sucrose (%) | Reaction Minutes | ° C. | APS (microns) | SSA (m²/g) |
|---|---|---|---|---|---|---|---|
| 9 | Lab | Bellefonte | 0.15 | 266 | 45.2 | 1.29 | 8.8 |
| 10 | Plant | Bellefonte | 0.15 | 298 | 44.9 | 1.28 | 7.7 |

EXAMPLES 11, 12, 13

These three products were made after the fashion of Example 1 using three different lime sources, Greer lime, Frey lime and Western lime. All of the products were carbonated with 0.1% sucrose and at a starting carbonation temperature of 45° C. The average particle size and specific surface area results are in following Table 4.

TABLE 4

EFFECT OF LIME TYPE

| Example | Lime Description | Reaction Time (minute) | APS (microns) | SSA (m²/g) |
|---|---|---|---|---|
| 11 | Greer | 130 | 1.63 | 6.9 |
| 12 | Frey | 130 | 1.42 | 9.6 |
| 13 | Western | 125 | 1.27 | 9.2 |

We claim:

1. A process for preparing discrete particles of calcium carbonate consisting of preparing an aqueous calcium hydroxide slurry, adding a carbohydrate to the aqueous calcium hydroxide slurry, carbonating the aqueous calcium hydroxide slurry after selecting a starting carbonation temperature from about 30° C. to about 85° C. to produce discrete calcium carbonate particles, wherein the carbohydrate is selected from the group consisting of sucrose, glucose, fructose, raw sugar, molasses, gums, starches, maltose, lactose, cellobiose, cellulose and glycogen.

2. The process of claim 1, wherein the concentration of the carbohydrate is from about 0.05 weight percent to about 3.0 weight percent.

3. The process of claim 2, wherein the concentration of the carbohydrate is from about 0.1 weight percent to about 1.0 weight percent.

4. The process of claim 1, wherein the carbohydrate is sucrose.

* * * * *

UNITED STATES PATENT AND TRADEMARK OFFICE
CERTIFICATE OF CORRECTION

PATENT NO.    : 6,294,143 B1
DATED         : September 25, 2001
INVENTOR(S)   : Deutsch et al.

It is certified that error appears in the above-identified patent and that said Letters Patent is hereby corrected as shown below:

<u>Column 2,</u>
Line 18, "U.S. Pat. No. 2,188,633" should read -- U.S. Pat. No. 2,188,663 --
Line 25, "J.P. 9-271,313" should read -- J.P. 6-271,313 --

Signed and Sealed this

Fifteenth Day of June, 2004

JON W. DUDAS
*Acting Director of the United States Patent and Trademark Office*